United States Patent [19]

Giles, Sr. et al.

[11] Patent Number: 4,838,244

[45] Date of Patent: Jun. 13, 1989

[54] DEEP-FAT FRYING APPARATUS

[75] Inventors: William O. Giles, Sr., Montgomery; William T. McNeal, Pratville, both of Ala.

[73] Assignee: Giles Enterprises, Inc., Montgomery, Ala.

[21] Appl. No.: 135,278

[22] Filed: Dec. 21, 1987

[51] Int. Cl.⁴ ............................................. A47J 27/00
[52] U.S. Cl. ................................ 126/391; 126/360 A; 99/403
[58] Field of Search ............ 126/391, 360 R, 343.5 A; 431/264; 99/403

[56] References Cited

U.S. PATENT DOCUMENTS

| | | | |
|---|---|---|---|
| 2,182,735 | 12/1939 | O'Dowd | 126/391 |
| 2,290,784 | 7/1942 | Turpin | 126/343.5 A |
| 2,429,360 | 10/1947 | Kells | 126/391 |
| 3,712,289 | 1/1973 | Reid et al. | 126/391 |
| 4,628,903 | 12/1986 | Farnsworth et al. | 126/391 |
| 4,751,915 | 6/1988 | Price | 126/391 |

Primary Examiner—Randall L. Green
Attorney, Agent, or Firm—Berman, Ausenberg & Platt

[57] ABSTRACT

Frying apparatus of the invention includes a vessel for containing deep fat in which the chicken or other foods are cooked, surrounded by an annular heat exchange chamber and a gas-fired burner. The gas-fired burner is positioned at an inlet into a combustion chamber communicating with the heat exchange chamber, and ignited gas-air mixture enters the heat exchange chamber and is directed in a substantially horizontal flow path by turreted, elongated flanges attached to a wall, preferably the inner wall, of the heat exchange chamber. Gases leaving the heat exchange chamber are channeled through an exhaust system in which the air flow is monitored so that if the exhaust pipe is obstructed, the apparatus will shut down instantaneously and will not restart until the obstruction in the exhaust pipe is removed. The apparatus will then reignite automatically. The gas burner has a plurality of spaced apart slits for flame emission separated by tapered grooves.

15 Claims, 5 Drawing Sheets

DEEP-FAT FRYING APPARATUS

FIELD OF THE INVENTION

The invention relates to deep fat frying apparatus and, in particular, to gas-fired apparatus of this type.

BACKGROUND OF THE INVENTION

Gas-fired fryers for commercial deep fat frying of chicken or other foods are well known, and are less efficient than desirable. In the frying apparatus of Reid, Jr., U.S. Pat. No. 3,712,289, the oil is heated by an annular infrared radiant gas burner assembly which heats the oil primarily by infrared radiation passing from the burner assembly directly through the vessel wall. Jaye, U.S. Pat. No. 2,573,144, shows a slotted outlet gas burner head having a plurality of outlets 5, but the burner is without the novel features of internal structure found in the burner of the invention.

SUMMARY OF THE INVENTION

Frying apparatus of the invention includes a vessel for containing deep fat, in which chicken or other foods are cooked, surrounded by an annular heat exchange chamber. A gas-fired burner has an inlet into the heat exchange chamber, and ignited gas-air mixture enters the heat exchange chamber and is directed in a substantially horizontal flow path by turreted, elongated fins attached to a wall, preferably the inner wall, of the heat exchange chamber. Gases leaving the heat exchange chamber are channeled through an exhaust system in which the air flow is monitored so that, if the exhaust pipe is obstructed, the apparatus will shut down instantaneously and will not restart until any obstruction in the exhaust pipe is removed. The apparatus will then reignite automatically.

It is an object of the invention to provide an improved gas-fired frying apparatus.

It is a further object of the invention to provide a gas-fired frying apparatus having a burner communicating with an annular heat exchange chamber which surrounds the cooking vessel.

DETAILED DESCRIPTION OF THE INVENTION

The frying apparatus of the invention is more efficient than known apparatus due to the novel design and efficiency of the burner, heat exchanger and exhaust system. The fryer also has a self-contained filtering system, including a filter pump located above all grease levels, which enables hot liquid shortening to drain back into the filter pan or into the frying reservoir of the cooker. The unit is automatically controlled and can, for example, fry forty pieces of chicken (five chickens, each weighing two and a half pounds and each cut into eight pieces) in a cooking cycle of twelve minutes.

Figure 1:
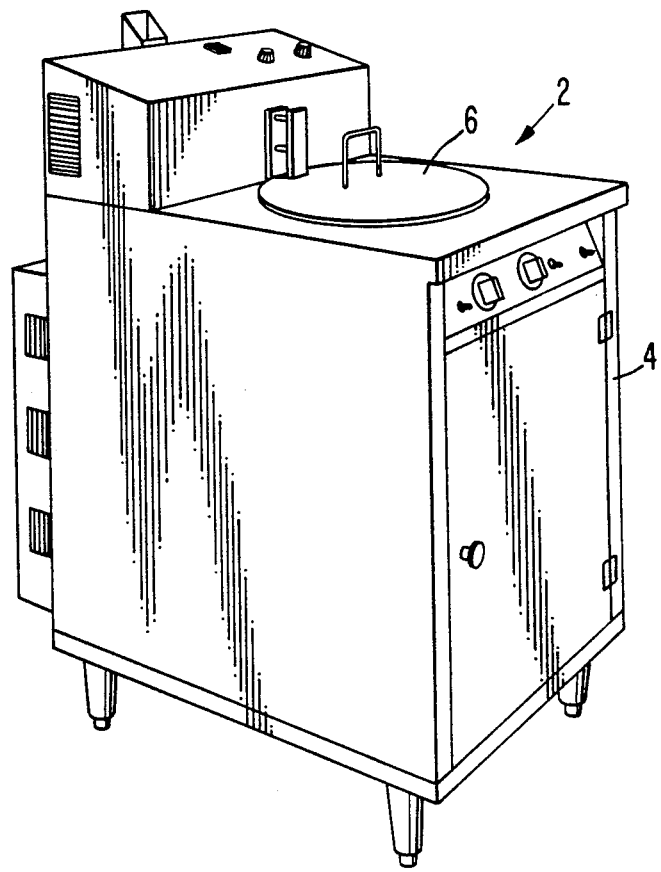
FIG. 1 is a front perspective view of frying apparatus of the invention.
Figure 2:
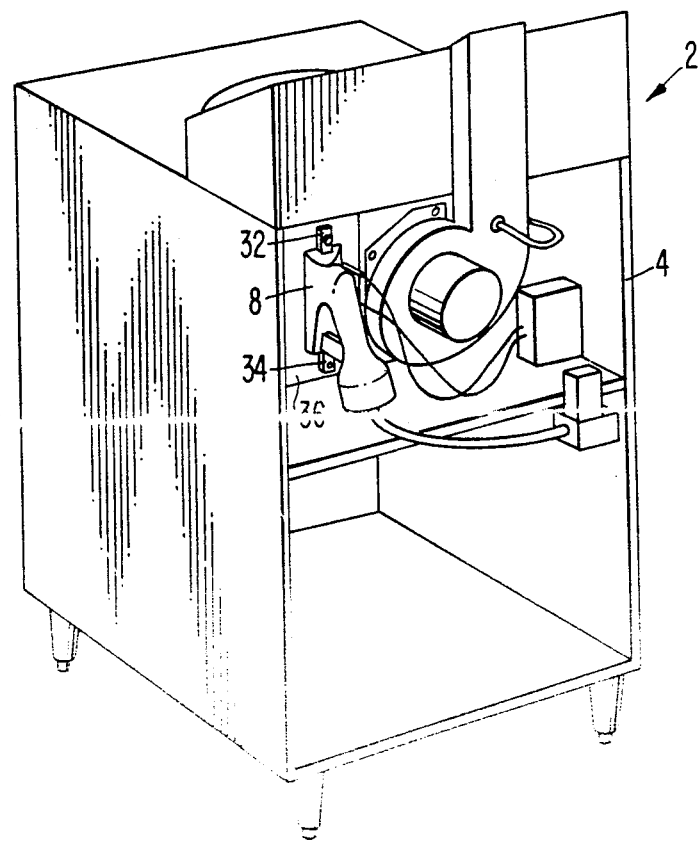
FIG. 2 is a back perspective view of the apparatus of FIG. 1.
Figure 3:
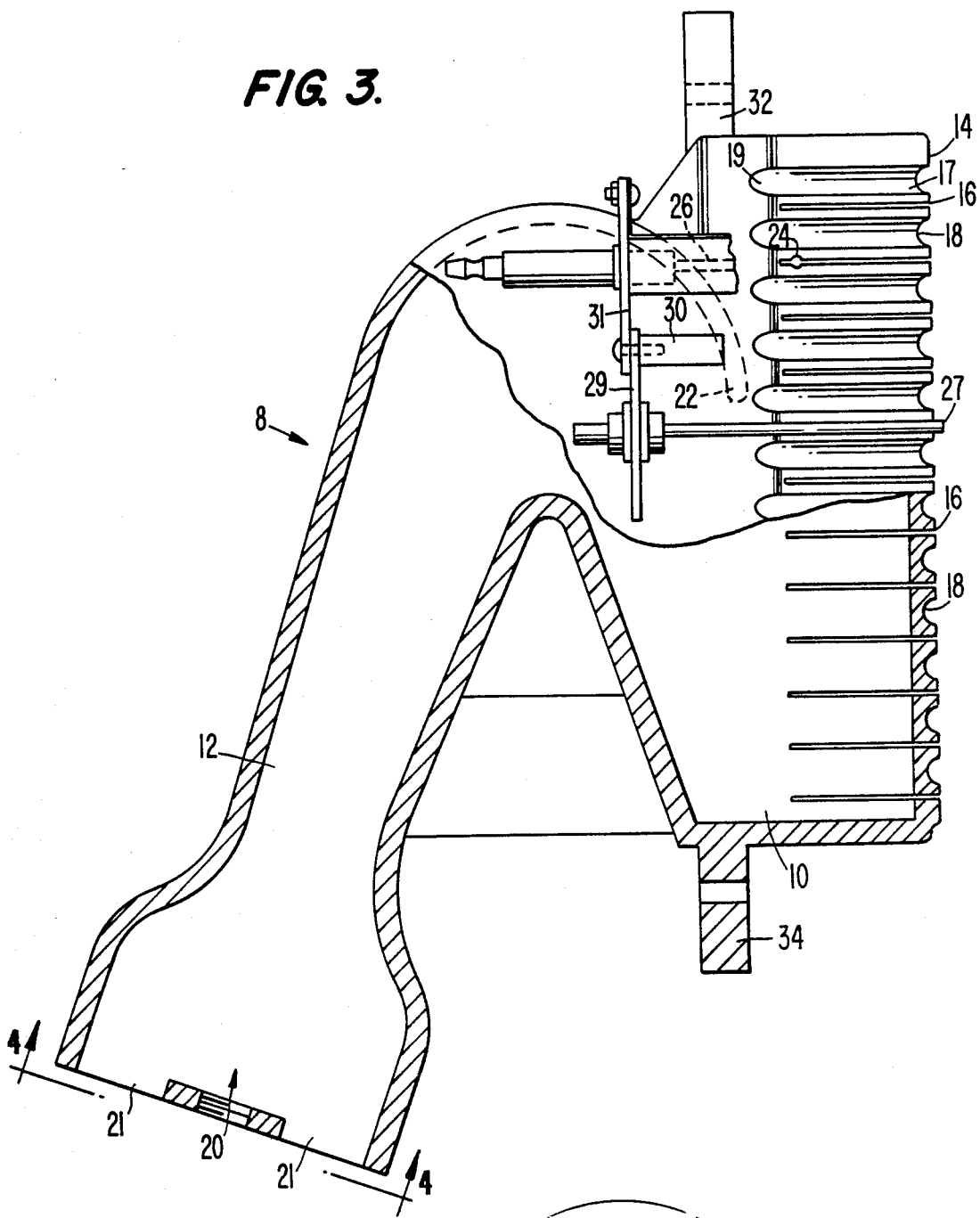
FIG. 3 is a side elevation view, partly cut away to show a cross-section view, of a burner useful with the apparatus of FIG. 1.
Figure 4:
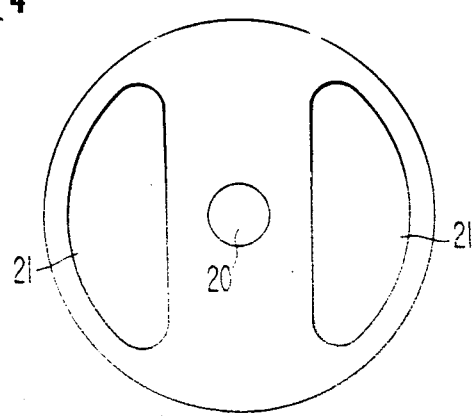
FIG. 4 is a bottom end view of the burner of FIG. 3.

With reference to the Figures, in which like numerals represent like parts, FIGS. 1 and 2 show free-standing deep-fat frying apparatus 2 having a cabinet 4 in which the equipment is housed. Lid 6 covers the cooking vessel chamber and burner 8 can be seen at the back of the apparatus, attached to chamber 36 by means of struts 32 and 34.

FIGS. 3 to 6 show burner 8 in greater detail. Burner 8 is a substantially hollow, cast-iron structure having burner head 10 and tubular inlet chamber 12 cast integrally together. Burner head 10 has a substantially semi-circular burner surface 14, shown in FIGS. 5 and 6, which has a plurality of slits 16 disposed along its length. The slits extend from side to side around the semi-circular surface 14 of the burner. Slits 16 are separated by grooves 18 which likewise extend from side to side around the semi-circular surface of burner 8.

Grooves 18 are tapered from the outside edge 19 to the center portion 17. At the outside edge 19, grooves 18 are, in a non-limiting example, about 5/32 inch in depth, and are oval in cross-section with a top width of about ¼ inch. Grooves 18 are tapered toward center portion 17 and have a depth of about 3/32 inch at center portion 17. Grooves 18 on each side of burner head 10 meet at center portion 17. The grooves serve as air vanes within the burner and direct the gas-air mixture to the burner slits. The irregularity at center portion 17, where grooves 18 from both sides of burner head 10 meet, provides deflection of the air flow. This design of burner head operates at about 75 to 80% efficiency with butane or natural gas, and emits a minimum amount of carbon monoxide and carbon dioxide into the exhaust gases.

Figure 5:
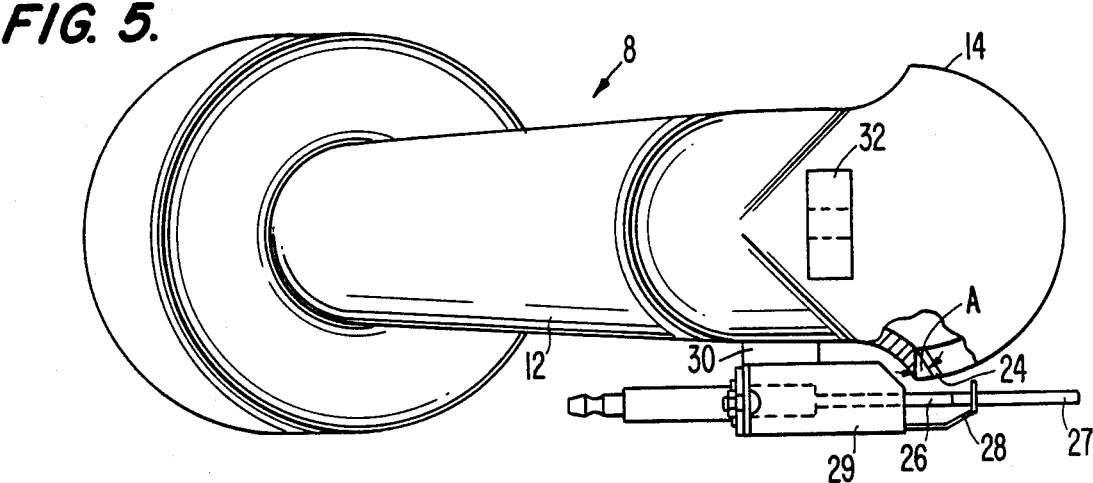
FIG. 5 is a top end view of the burner of FIG. 3.
Figure 6:
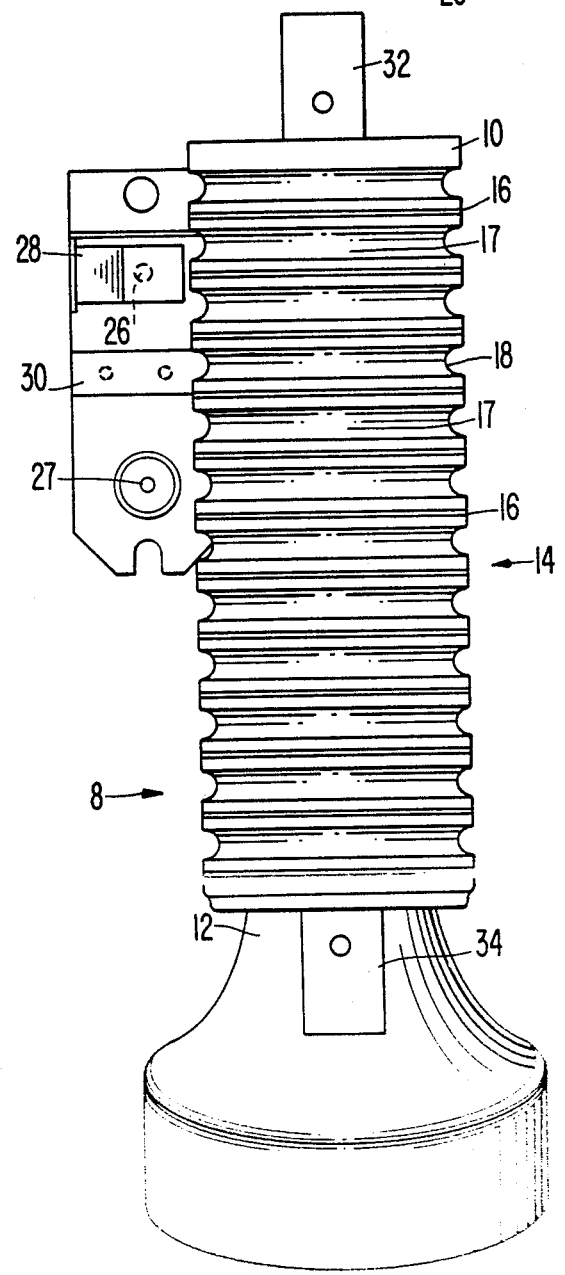
FIG. 6 is another side elevation view of the burner shown in FIG. 3.

Gas enters burner 8 through inlet 20, and air enters burner 8 through inlets 21, and the gas-air mixture formed in inlet chamber 12 then passes through chamber 12, past curved baffle 22, to be ignited at porthole 24, the flames extending through slots 16 in burner head 10. An air shutter is not required at the air intake. Porthole 24 allows a stream of gas-air mixture to leave burner 8 and surround the tip of electronic igniter 26 to facilitate ignition. FIG. 5 shows porthole 24 slanted to extend at an angle A, which may be between about 20° and 40° to a perpendicular to the longitudinal axis of electronic igniter 26. Porthole 24 preferably extends at an angle between 25° and 35°, and more preferably at about 30°, to the perpendicular to the axis of igniter 26, thus directing gas leaving porthole 24 towards the tip of igniter 26 to facilitate ignition. The gas is ignited through slots 16 and flames spread from end to end of the burner. Shields 28 and 29 ensure that gas leaving porthole 24 surrounds igniter 26. Ignition sensor 27 is connected to boss 30 by plate 29, and igniter 26 is connected thereto by plate 31. Igniter 26 and ignition sensor 27 are mounted, for example with screws, on boss 30. Ignition sensor 27 senses the ignition timing and if ignition does not take place within 11 seconds, a warning alarm sounds, and the unit shuts off. Burner 8 is attached to apparatus 2 by means of struts 32 and 34 secured by screws or bolts to the outside of combustion chamber 36, and communicating with the inside of the combustion chamber, as shown in FIG. 2.

Figure 7:
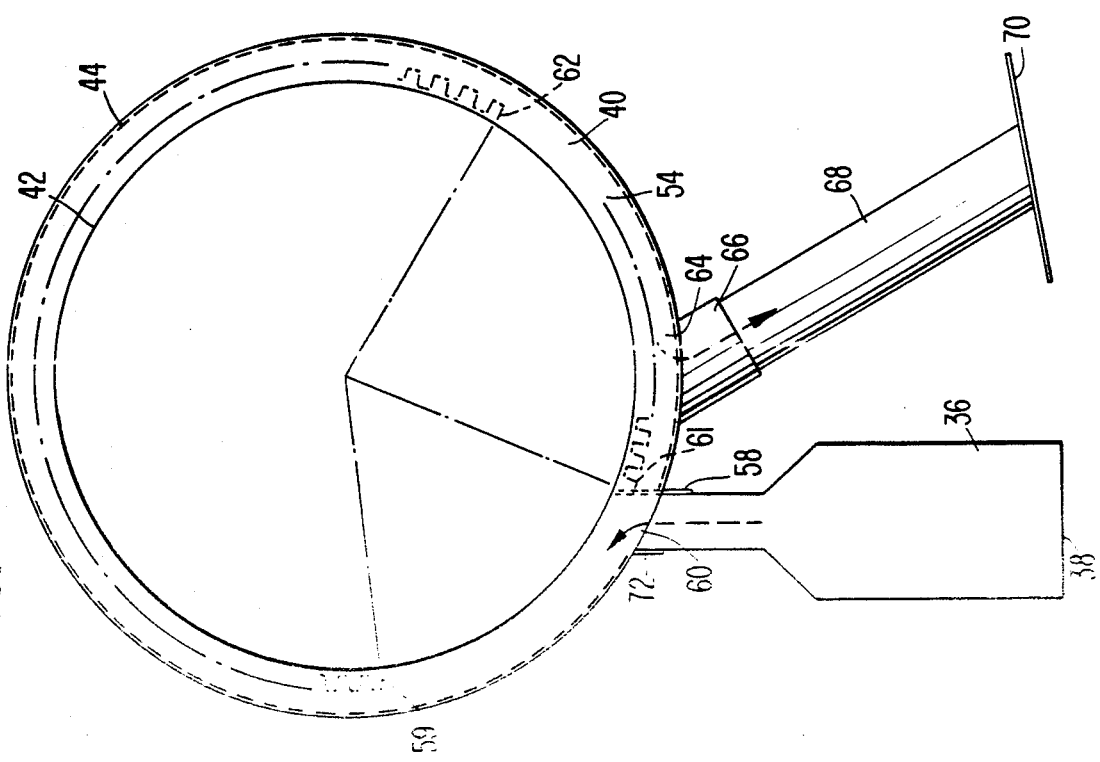
FIG. 7 is a top view of an annular heat exchanger useful with the apparatus of FIG. 1.

The flow of air/oxygen through burner 8 and through the heat exchange tunnel/chamber 40 (FIG. 7) is monitored in the exhaust passage leaving the heat exchange chamber. Should the exhaust passage become blocked by 30% or more, the blockage is sensed electronically, and the burner shuts down automatically and cannot be relit until any obstruction in the exhaust pipe is removed. The burner relights automatically when the exhaust passage is cleared. A suitable electronic sensor is manufactured by Cleveland Controls, Inc., Cleveland, Ohio.

Figure 9:
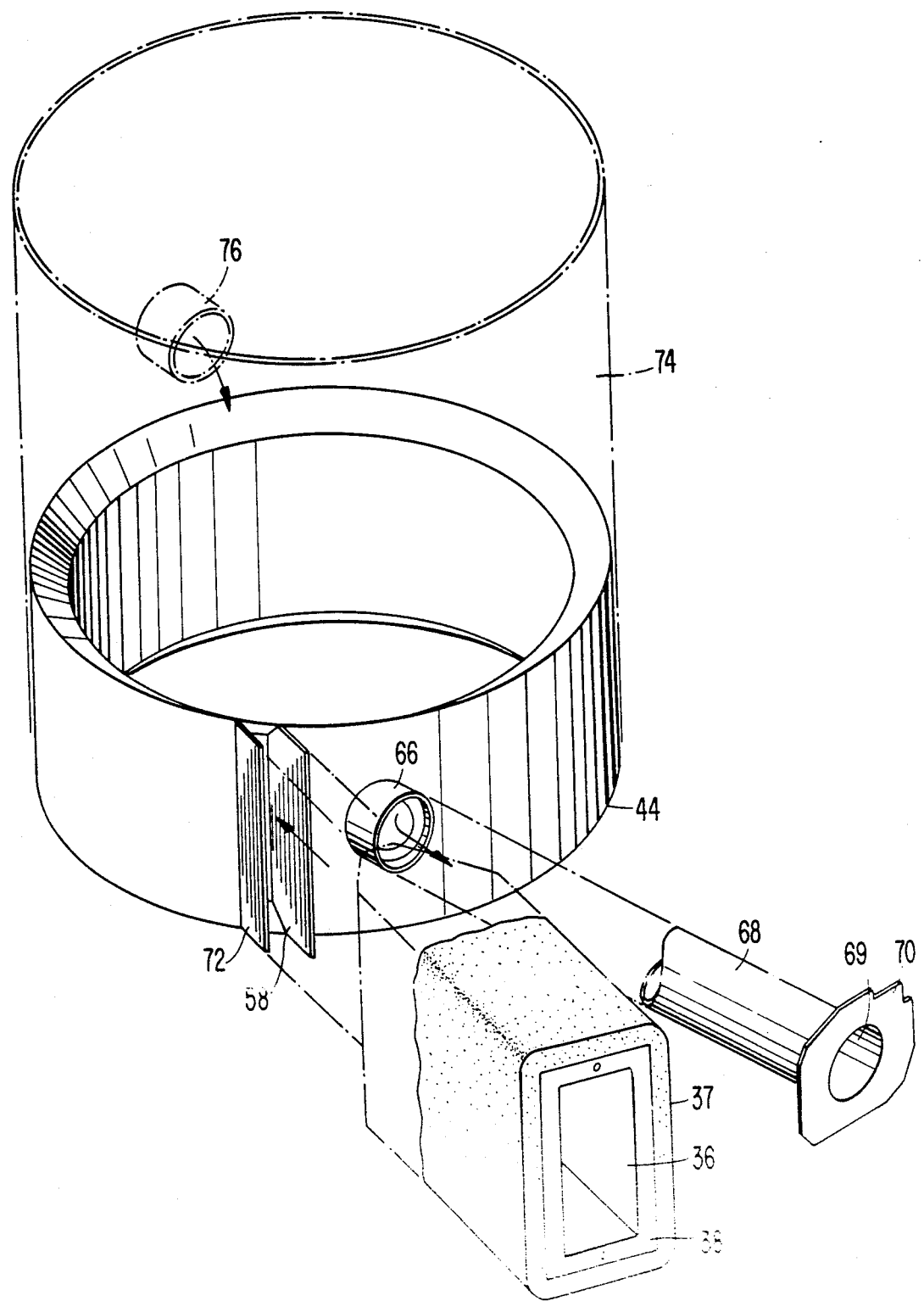
FIG. 9 is a perspective view, partly in phantom, showing a heat exchanger in position in a cooking vessel, and the burner inlet and exhaust outlet.

In use, gas enters the burner through a line attached to inlet 20 and air enters through apertures 21 to provide a gas-air mixture which is ignited and burned by flames extending from semicircular slots 16 along the length of burner 8. Burner 8 is secured to combustion chamber 36, shown in FIG. 2. Chamber 36 is constructed of highly polished steel to withstand a temperature of 1750° F., and covered with insulating material 37, such as ceramic fiber, to reduce the outside surface temperature of the chamber and to conserve heat within the structure as shown in FIG. 9. Walls of combustion chamber 36 are tapered to conserve and transmit the maximum amount of heat discharged from gas burner 8 to heat exchange chamber 40. Burner 8 is attached to end 38 of chamber 36 by struts 32 and 34 of the burner. Heated air emitted from burner 8 enters chamber 36 and heat exchange chamber 40.

Heat exchange chamber 40 is an annular, highly polished steel chamber bounded by inner wall 42 and outer wall 44. Inner wall 42 is substantially contiguous with the outer wall of the cooking vessel, in order for heat to be transferred to the contents of the cooking vessel.

Figure 8:
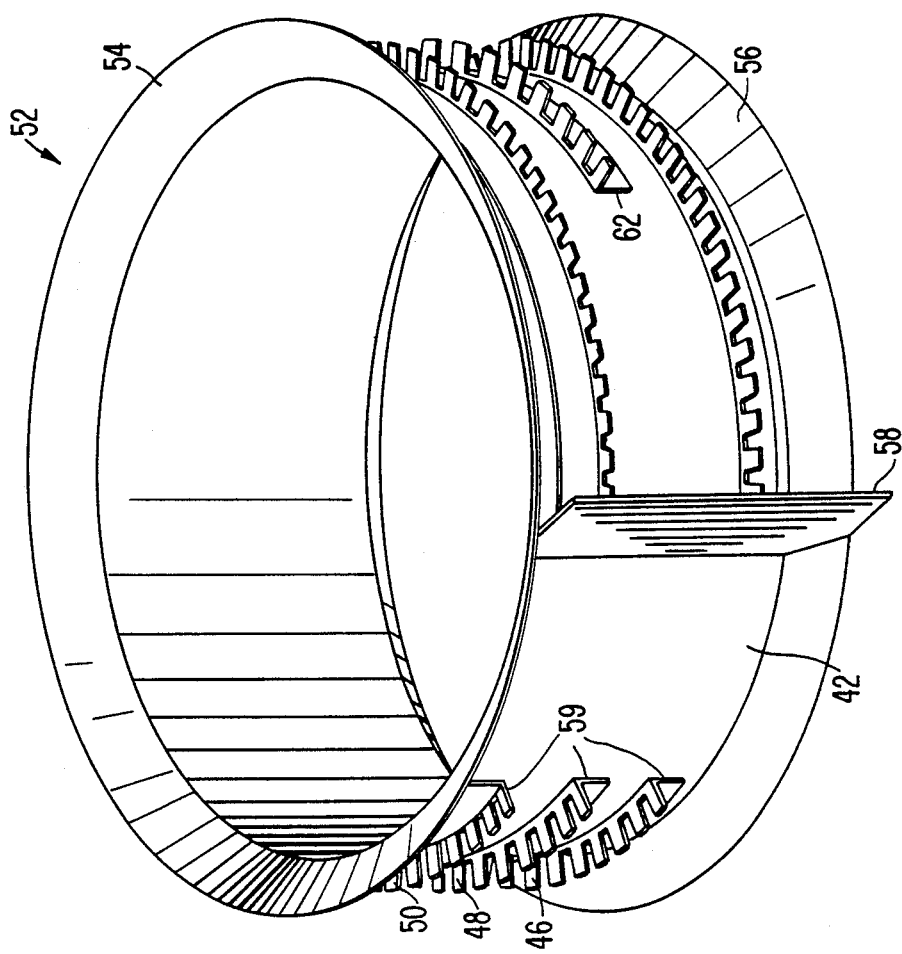
FIG. 8 is a perspective view of the inner ring of the heat exchanger shown in FIG. 7.

Elongated fins 46, 48 and 50, shown in FIG. 8, are welded to inner wall 42 of the heat exchange chamber, and extend around and substantially parallel to the base of heat exchange chamber 40, to channel hot air around chamber 40. Each fin 46, 48 and 50 is preferably cut into a turreted or castellated shape on the outer edge of the fin which projects substantially perpendicularly from inner wall 42 of the heat exchange chamber 40. Other designs and locations for these fins will be apparent to one skilled in the art.

The heat exchange chamber is fabricated with inner wall 42 of ring 52 having upper edge rim 54 and lower edge rim 56 extending outward at an angle of approximately 45° from top and bottom edges of inner wall 42. Dividing wall 58 extends outwardly from inner wall 42 and is welded to inner wall 42, upper edge rim 54 and lower edge rim 56, and subsequently welded to outer wall 44 when the heat exchange chamber is assembled.

Fins 46, 48 and 50 are welded to inner wall 42, one end 59 of each fin being spaced from the burner inlet 60 and dividing wall 58. Lower and upper fins 46 and 50 extend around inner wall 42 from one end 59 to the other end 61 adjacent divider 58, and middle fin 48 extends from one end 59 to its other end 62 which is spaced away from exhaust outlet 64 in outer wall 44. Outer wall 44 is provided with exhaust outlet flange 66 to which flue 68 is attached. An exhaust fan (not shown) is fitted to an aperture 69 in plate 70 and the exhaust is led away be conventional duct work (not shown).

The heat exchanger is assembled, by welding, as shown in FIG. 9, and extension 72, which extends at an angle to outer wall 44, is fitted to the burner inlet. Burner inlet 60 fits tightly between extension 72 and divider 58 and is welded in that position. The burner/heat exchange chamber/exhaust system of the invention provides improved heating efficiency.

The design of the burner/heat exchanger and exhaust system allows the heat exchanger to capture more than 70% of the heat efficiency of the burner. The burner is, for example, a 50,000 BTU burner and emits minimum amounts of carbon monoxide and carbon dioxide.

Variations, such as in the number and design of fins 46, 48 and 50 are within the scope of the invention. The fins may alternatively be mounted on the outer wall 44 of the heat exchange chamber, or on both walls, but mounting on inner wall 42 is preferred.

FIG. 9 shows the heat exchange chamber fitted into the frying chamber 74, and shows (in phantom), the elevated position of the fat drainage inlet 76 from the filter system (not shown), for returning filtered oil (or other fat) to the frying vessel. This drainage inlet 76 is positioned above the level of deep fat in the frying vessel to prevent a fire hazard. In use, the heat exchanger is attached to the frying vessel so that any crumbs falling from the frying frying vessel so that any crumbs falling from the frying food will fall into this cold zone, thus eliminating burning. Frying medium, such as oil or shortening, circulates around the inside and outside of the heat exchange chamber, including the relatively small space between the inner wall of frypot 74 and outer wall 44 of the heat exchange chamber. The bottom of frypot 74 has a drain plug (not shown).

In use, the electronic ignition is activated to light the burner, the oil is heated, and about forty pieces of chicken (five chickens, each of 2½ pounds, each cut into 8 pieces) are cooked in a twelve minute cooking cycle. The device is efficient and safe.

The frying apparatus also includes automatic control and timing systems known to those skilled in the art.

While the invention has been described above with respect to certain embodiments thereof, it will be appreciated that variations and modifications may be made without departing from the spirit and scope of the invention.

What is claimed is:

1. Frying apparatus comprising:
   vessel means for containing cooking fat;
   heat exchange means comprising an annular chamber having an inner wall and an outer wall for containing heated air extending substantially circumferentially around the inside of said vessel means;
   burner means for heating air communicating with said annular chamber, said burner means including electronic ignition means for igniting a stream of gas-air mixture;
   directing means secured to at least one wall of the annular chamber for directing flow of heated air within the annular chamber of said heat exchange means;
   entry means in the outer wall of the annular chamber for enabling heated air to enter the heat exchange means; and
   exit means in the outer wall of the annular chamber for exhausting heated air from the annular chamber.

2. Frying apparatus of claim 1 wherein said means for directing flow of heated air comprises fin means secured to a wall of said heat exchange means for directing heated air substantially horizontally within the annular chamber.

3. Frying apparatus of claim 2 wherein the fin means extends substantially perpendicularly outward from an inner wall of the heat exchange means.

4. Frying apparatus of claim 3 wherein the fin means extending substantially perpendicularly to the inner wall is turreted.

5. Frying apparatus of claim 4 comprising three fin means.

6. Frying apparatus of claim 2 comprising at least one fin means.

7. Frying apparatus of claim 6 comprising three fin means.

8. Frying apparatus of claim 1 wherein the entry means comprises means for communication between the burner means and the heat exchange means.

9. Frying apparatus of claim 8 wherein the entry means comprises an insulated combustion chamber.

10. Frying apparatus of claim 1 wherein the vessel means comprises a cylindrical vessel and the annular chamber extends substantially circumferentially around and spaced from the inside wall of the cylindrical vessel.

11. Frying apparatus of claim 10 wherein the entry means and the exit means are separated by divider means for separating the inner wall and the outer wall of the annular chamber.

12. Frying apparatus of claim 1 wherein the burner means comprises means for burning a mixture of gas and air, said burner means further comprising porthole means for permitting a stream of gas to surround ignition means for igniting the gas.

13. Frying apparatus of claim 12 wherein the longitudinal axis of the porthole means is slanted at an angle of between about 20° and 40° to an axis perpendicular to the length of the ignition means.

14. Frying apparatus of claim 12 wherein the burner further comprises a plurality of spaced apart slit means for facilitating ignition of gas-air mixture separated by a plurality of spaced apart groove means tapered from a greater depth at an outside portion of the inner head to a lesser depth at a center portion of the burner head.

15. Frying apparatus comprising:
vessel means for containing cooking fat;
heat exchange means comprising an annular chamber having an inner wall and an outer wall for containing heated air extending substantially circumferentially around the inside of said vessel means;
burner means for heating air communicating with said annular chamber;
directing means secured to at least one wall of the annular chamber for directing flow of heated air within the annular chamber of said heat exchange means;
entry means in the outer wall of the annular chamber for enabling heated air to enter the heat exchange means; and
exit means in the outer wall of the annular chamber for exhausting heated air from the annular chamber.

* * * * *